United States Patent Office 3,801,520
Patented Apr. 2, 1974

3,801,520
CARBON DIOXIDE AND WATER TREATMENT OF COUPLED LITHIUM INITIATED POLYMER
John Paul Hogan, Alonzo G. Kitchen, and Gerald R. Kahle, Bartlesville, Okla., assignors to Phillips Petroleum Company
No Drawing. Filed Jan. 21, 1972, Ser. No. 219,818
Int. Cl. C08d 5/02, 5/04
U.S. Cl. 260—23.7 R
14 Claims

ABSTRACT OF THE DISCLOSURE

The effluent from a lithium initiated polymerization, wherein a coupling agent is utilized to join two or more polymer molecules together, with the resulting generation of LiO—, LiS—, or

groups is treated with carbon dioxide and water to improve the color and maintain low haze of the resulting polymer.

BACKGROUND OF THE INVENTION

This invention relates to treating coupled lithium initiated polymer to improve color and maintain low haze of the resulting polymer.

A common problem in the production of polymeric materials such as resins and rubbers is the formation of an undesirable color in the polymer. It is broadly known that such color development can be retarded in varying degrees by treating the polymer with various chemicals including alcohols and acids.

Recently, polymer has been produced wherein lithium initiated polymer chains are contacted with a coupling agent to join two or more polymer molecules together. If the coupling agent contains three or more reactive sites, a radial polymer is formed with the separate polymer chains radiating out from the coupling agent nucleus. Production of such polymers is described in Zelinski U.S. 3,281,383. In such polymers if the coupling agent is an epoxidized linseed oil or soybean oil having a plurality of epoxy or oxirane groups one of the oxygen-carbon bonds will be broken with the lithium attaching to the oxygen and the polymer to the carbon. Thus there is present, not C-Li bonds, but rather O-Li bonds. Thus the conventional acid and alcohol treatment to improve color which is known in the art for systems containing C-Li bonds would not be expected to be effective with an O-Li bond which does, of course, have totally different charactertistics.

SUMMARY OF THE INVENTION

It is an object of this invention to provide a coupled polymer with improved optical properties; it is further an object of this invention to provide a coupled polymer with improved color; and it is yet another object of this invention to improve both optical properties and stability of coupled polymers.

In accordance wth this invention the effluent from a lithium initiated polymerization, wherein the polymer molecules have been contacted wth a coupling agent having at least two reactive sites, with the resultant generation of LiO—, LiS— or

groups, is treated with carbon dioxide and water.

DESCRIPTION OF THE PREFERRED EMBODIMENTS

The polymers for which this invention is applicable are those prepared by a conventional lithium initiation and thereafter treated with a coupling agent having at least two, preferably at least three, reactive sites so as to give a coupled polymer. The Zelinski et al. patent referred to hereinabove describes in detail the preparation of the preferred polymers for use in the practice of this invention and the disclosure thereof is incorporated herein by reference.

More preferably the polymers used in the practice of this invention are copolymers of a conjugated diene and a vinyl substituted aromatic compound prepared by producing the polymer in the presence of an organolithium initiator to give a polymer containing an active lithium atom on one end of the polymer chain as more fully described in said Zelinski et al. patent. This lithium-terminated polymer is then reacted with a compound which has at least two, preferably at least three, reactive sites capable of reacting with the carbon-lithium bond and adding to the carbon possessing this bond in the polymer. The applicable coupling compounds will be discussed in greater detail hereinbelow. The result in the preferred embodiment wherein the coupling agent has at least three reactive sites, is a polymer having relatively long branches which radiate from a nucleus formed by the polyfunctional compound which reacted with the lithium-terminated polymer. The preferred organolithium compound comprises lithium attached to a hydrocarbon radical selected from the group consisting of aliphatic, cycloaliphatic and aromatic radicals containing 1–20 carbon atoms, such as n-butyllithium.

The preferred polymers used in the practice of this invention are resinous polymers containing 70–95 weight percent polymerized monovinyl-substituted aromatic hydrocarbon monomer containing from about 8–18 carbon atoms per molecule and from about 30–5 weight percent polymerized conjugated diene monomer containing about 4–12 carbon atoms per molecule, said polymer having a melt flow in the range of about 0.5–200 grams per minute as described by ASTM D 1238–65T, condition G. More preferably the polymer is produced by sequential addition of the monovinyl-substituted aromatic hydrocarbon monomer and the conjugated diene monomer so as to give what would be theorized to be a block copolymer. For example, polymer formed by means of the following sequential steps gives lithium terminated branches demonstrating a plurality of modes on a gel permeation chromatograph curve to form a polymer of a more preferred embodiment of the invention wherein the branched block copolymer chains radiating from the central nucleus are of varying length:

(a) Contacting under polymerization conditions at a temperature up to about 250° F. a monovinyl-substituted aromatic hydrocarbon monomer containing from about 8–18 carbon atoms per molecule with an organolithium polymerization initiator containing from about 1–20 carbon atoms per molecule wherein said monovinyl-substituted aromatic hydrocarbon monomer is employed in an amount to provide from about 40–90 weight percent of the total monovinyl-substituted aromatic hydrocarbon employed in preparing said copolymer wherein said initiator is employed in an amount to provide from about 0.01–0.2 part by weight of initiator per 100 parts by weight of said monomer and continuing said contacting for a period of time sufficient to polymerize essentially all of said monovinyl-substituted aromatic hydrocarbon monomer;

(b) Charging to the polymerization reaction product of step (a), in one or more increments, the remaining monovinyl-substituted aromatic hydrocarbon monomer representing from about 10–60 weight percent of said total monovinyl-substituted aromatic hydrocarbon monomer employed in preparing said copolymer, wherein for each incremental charge of monovinyl-substituted aromatic hydrocarbon monomer additional said organolithium initiator is provided in an amount from about 0.1–1.5 parts by weight of said initiator per 100 parts by weight of said incremental charge of monomer, wherein after each monomer and initiator charged a sufficient contacting time is allowed to permit essentially complete polymerization of the newly added monomer, wherein the amount of initiator employed per 100 parts by weight of each incremental monomer charge of step (b) exceeds the amount of initiator employed in step (a) by at least 0.1 part of initiator per 100 parts of monomer by weight and wherein the total amount of said monovinyl-substituted aromatic hydrocarbon monomer employed in steps (a) and (b) comprises from about 70–95 weight percent of the total weight of said branched block copolymer based upon the total weight of all of the monomers employed;

(c) Charging to the polymerization reaction product of step (b) a conjugated diene monomer containing from about 4–12 carbon atoms per molecule and polymerizing to essential completion said diene monomer in the presence of said reaction product to form a block copolymer, and wherein the amount of said diene monomer comprises from about 30–5 weight percent of the total weight of said branched block copolymer based upon the total weight of all of the monomers employed; and (d) Charging to the polymerization reaction product of step (c) a polyfunctional treating agent capable of reacting with terminal lithium atoms on a preformed polymer to form a branched polymer wherein said polyfunctional treating agent is employed in an amount to provide from about 0.05–2 equivalents of said polyfunctional treating agent per gram atom of lithium employed in said polymerization process.

The coupling agent to be used in producing the polymers utilized in the practice of this invention, as noted hereinabove, must contain at least two, preferably three, reactive sites and is generally of the type which will result in an O-Li bond. Exemplary reaction sites and the resulting postulated reaction with the polymer lithium chains from the polymerization reaction are shown hereinbelow wherein one of the reactive groups is shown, it being understood that the coupling agent molecule will have at least two, preferably three or more, of these groups. This group is shown reacting with the polymer lithium chains with the polymer being represented by the character R. The R' groups on the coupling agent are preferably hydrogen although they may also be 1–8 carbon atom hydrocarbon radicals. The R'' groups can be either hydrogen or 1–20 carbon atom hydrocarbon radicals. Applicants, of course, do not wish to be bound by theory but as noted hereinabove, the following reactions are postulated to represent the reactions taking place.

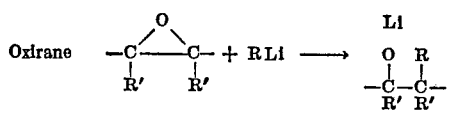

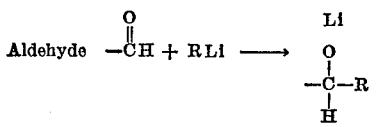

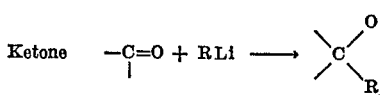

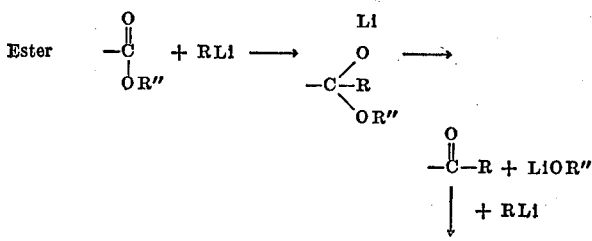

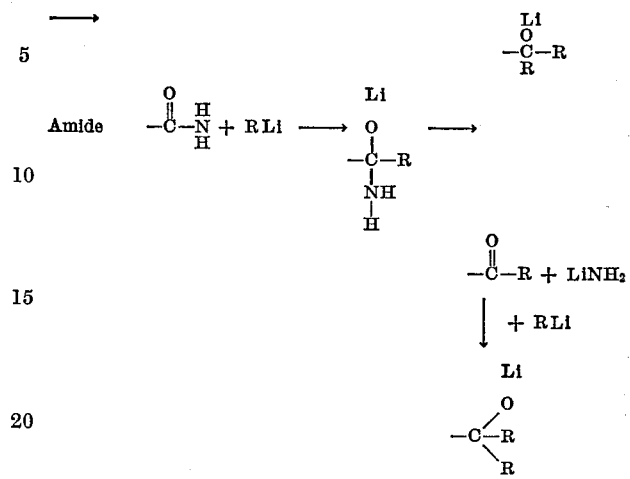

The instant invention can also be practiced on polymers produced using coupling agents which give reactions closely analogous to that of those described hereinabove so long as there is not produced a C-Li bond. Exemplary of these additional embodiments of the coupling agent are shown in the postulated reactions hereinbelow.

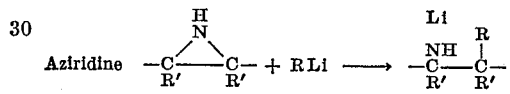

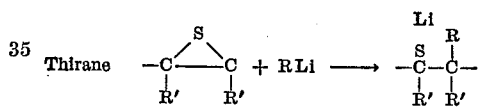

It is to be noted that the invention is directed to treating the effluent from a polymerization reaction prior to contact with a phenolic antioxidant. Thus it is also within the scope of the invention to use the carbon dioxide and water treatment in any coupled polymerization effluent containing —OLi groups (or the analogous —NHLi or —SLi) whether attached to the polymer molecule or not. For example the living polymer molecule can be terminated with a tetraalkoxy silane, trialkoxy, alkyl silane or the like to give a radial polymer and lithium alkoxide as shown in the postulated reactions hereinbelow where R''' is a hydrocarbon radical of 1–20 carbon atoms.

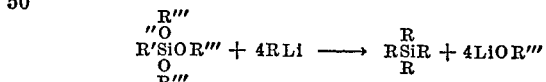

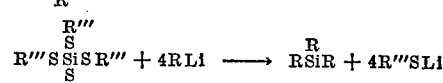

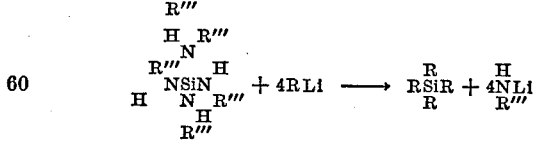

Broadly included within the scope of these agents is any compound having at least two, preferably at least three of the —OR''', —SR''' or

groups attached to a silicon atom.

Most preferably the coupling agent is an epoxidized unsaturated oil such as epoxidized soybean oil, epoxidized linseed oil and the like. Exemplary of such materials is the epoxidized linseed oil sold by Swift and Company under the trade name Epoxol 9–5. Also suitable is epoxidized polybutadiene. This designation means that the material has approximately 9 weight percent oxirane oxygen with approximately 5 epoxy groups per molecule. Actually the material has an average of about 5.5. The formula hereinbelow depicts a theoretical average molecule having six epoxy groups with a molecular weight of 980.

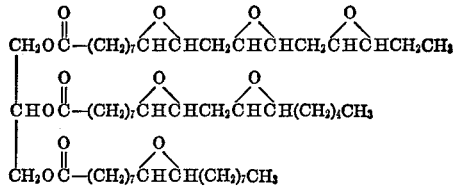

The carbon dioxide and water must under all circumstances be added prior to the addition of any phenolic containing antioxidant and preferably before the addition of an antioxidant of any type. The carbon dioxide and water can be added at the same time from separate streams or together in a combined stream or separately. It is preferred to add the water first with sufficient agitation to disperse same so that carbonic acid can form in situ on addition of the carbon dioxide.

Preferably the carbon dioxide and water will be added in approximately the theoretical amount necessary to react with the lithium. Of course, this could vary some with a range of .8 to 2 times the stoichiometric amount of carbon dioxide and water generally being used. Preferably at least a stoichiometric amount of carbon dioxide based on lithium used. Also the ratio of water and carbon dioxide while preferably on an equal molar basis, can also vary from .5 to 100, preferably .5 to 10 mols of water per mol of carbon dioxide. If anything, a slight excess of water is preferred.

The treating time will be generally in the range of 0.01 to 100, preferably 1 to 10 minutes. Actually the time is more a function of mixing efficiency with the reaction being essentially instantaneous after contact; however, continued contact does not seem to harm the process.

After the treatment in accordance with the invention, the polymers can be blended with conventional additives such as fillers, pigments, antioxidants, and the like. The resulting polymers treated in accordance with the invention are of particular utility in the production of fabricated items such as injection molded bowls and the like where the improved color properties are of esthetic value.

The following data exemplify and further contrasts the treatments of the invention with prior art treatments. Resinous polymers were prepared by polymerizing styrene in cyclohexane diluent utilizing n-butyllithium as the initiator. After the styrene monomer was essentially completely polymerized butadiene monomer was introduced and the reaction continued until a butadiene block had been formed. Thereafter Epoxol 9-5 was added to form a branched block copolymer. Such polymer on processing, with no treatment, exhibited a very poor color. Utilizing a color rating determined subjectively by a panel viewing a molded sample wherein 1 is water white and 10 represents a very dark color, there is shown hereinbelow in Table I the results of applying conventional color removal techniques to this type of polymer.

CONTROL I

TABLE I

| n-BuLi,[1] p.h.m. | Treating agent, p.h.m. | Color rating | Haze, percent [2] | Melt flow drop off, percent [3] |
|---|---|---|---|---|
| 0.16 | 0.2 methanol plus 0.1 CO$_2$. | 4 |  | ([4]) |
| .11 | 0.12 acetic acid | 4 | 6.4 | 56 |
| 0.11 | 0.58 stearic acid | 1 | 19.6 | 100 |

[1] Per hundred parts monomer.
[2] As determined by ASTM D 1003-61, Procedure A.
[3] Measured by comparing melt flows obtained after 5 minutes at 230° C. and after 30 minutes at 230° C.
[4] Not run.

As can be seen alcohol and carbon dioxide were ineffective with the color rating being 4, which is unacceptable. Acetic acid also gave a poor color rating and also resulted in a polymer which had poor stability as indicated by the high melt flow drop off. Stearic acid appeared to give a satisfactory color rating but the sample had high haze which would mask the color and in addition had a melt flow off of 100 percent indicating that the polymer on heating to 230° C. for 30 minutes was so unstable that it crosslinked to a gel and would not flow at all. Thus, such a polymer is useless as a practical matter for most applications. The invention gives polymer having good color while maintaining good (low) base and also good processability (i.e. low melt index drop off).

Example I

The following example exemplifies the invention. Polymer essentially identical to that shown hereinabove was made in accordance with the following recipe and charge order.

TABLE II

Cyclohexane—2.6 lb.
Tetrahydrofuran—0.4 cc.
Styrene monomer—296 grams
1% n-butyllithium solution—47.3 grams
Butadiene monomer—98 grams
Epoxol 9-5—2.0 grams
Distilled water—4.0 cc.
CO$_2$—Purged in bottom

| Charge order | Reactor temp., °F. | Residence time, min. |
|---|---|---|
| Cyclohexane | 120 |  |
| Tetrahydrofuran | 120 |  |
| Styrene | 155-206 | 20 |
| n-Butyllithium | 115 |  |
| Butadiene | 166-209 | 23 |
| Epoxol 9-5 | 193-205 | 13 |
| Water | 205 | 5 |
| CO$_2$ | 182 | 10 |
| Antioxidant [a] | 165 | 15 |

[a] Polygard HR, 1.5 parts (tris-nonylphenyl phosphite plus ½% triisopropanolamine) BHT 0.5 part (2,6-di-tert-butyl-4 methylphenol).

NOTE.—Polymer recovered by evaporating the cyclohexane solvent, recovered polymer dried in a vacuum oven at 160-200° F., milled at 300° F., and chopped. Color rating of injection molded sample=1. (1=water while 10=very dark color.)

Two additional similar runs were made and the results are tabulated hereinbelow in Table III.

TABLE III

| n-BuLi, p.h.m. | Coupling treating Agent, p.h.m. | Color rating | Haze, percent | Melt flow drop off, percent |
|---|---|---|---|---|
| 0.09 | 0.2 water plus 0.1 CO$_2$ | 2 | 2.1 | 12 |
| 0.14 | do | 2 | 3.6 | 0 |

A comparison of the data from Tables II and III with the conventional treatment shown in Table I reveals that the treatment of the invention gives a polymer having both good color and good stablity which is not achieved by conventional treatments which are known for reducing color in systems having carbon-lithium bonds.

Example II

Polymer similar to that of Example I was made and coupled with 0.2 p.h.m. tetraethoxysilane. This polymer was treated with 0.2 p.h.m. water plus 0.1 p.h.m. carbon dioxide. The results are as follows.

TABLE IV

| Polymer preparation | H$_2$O, p.h.m. | CO$_2$, p.h.m. | Color rating [1] | Haze percent | Melt flow drop off, percent |
|---|---|---|---|---|---|
| One stage addition of styrene | 0 | 0 | 4 | 4.0 | 9 |
| Do | 0.2 | 0.1 | 1 | 4.7 | 17 |
| Two stage addition of styrene | 0.2 | 0.1 | 1 | 1.5 | 3 |

[1] 1=water while 10=very dark color.

CONTROL II

Polymer was prepared in a manner essentially identical to that for Example I as shown hereinbelow in Table V.

TABLE V

Cyclohexane—2.6 lb.
Tetrahydrofuran—0.4 cc.
Styrene monomer—296.0 grams
1% n-butyllithium solution—47.3 grams (0.473 g. n-BuLi)
Butadiene monomer—98.0 grams
Epoxol 9-5—2.0 grams
Distilled $H_2O$—4.0 cc.

| Charge order | Reactor temp., °F. | Residence time, min |
|---|---|---|
| Cyclohexane | 85 | |
| Tetrahydrofuran | 85 | |
| Styrene monomer | 149–191 | 23 |
| n-Butyllithium | 194 | |
| Butadiene monomer | 160–199 | 20 |
| Epoxol 9-5 coupling agent | 199–205 | 10 |
| $H_2O$, 1 p.h.m | 205–170 | 20 |
| Antioxidant a | 170 | 10 | a Polygard HR, 1.5 parts (tris-nonylphenyl phosphite plus ½% triisopropanolamine) BHT 0.5 part (2,6-di-tert-butyl-4-methylphenol)

NOTE.—Polymer recovered by evaporating the cyclohexane solvent recovered polymer dried in a vacuum oven at 160–200° F., milled at 300° F., and chopped. Color rating of injection molded sample=6

This reveals that the water alone is ineffective.

CONTROL III

The polymer was prepared in a matter essentially identical to that used in Example I as set out hereinbelow in Table VI.

TABLE VI

Cyclohexane—2.6 lb.
Tetrahydrofuran—0.4 cc.
Styrene monomer—296.0 grams
1% n-butyllithium solution—47.3 grams
Butadiene monomer—98.0 grams
Epoxol 9-5—2.0 grams
$CO_2$—purged in bottom of reactor

| Charge order | Reactor temp., °F. | Residence time, min. |
|---|---|---|
| Cyclohexane | 122 | |
| Tetrahydrofuran | 122 | |
| Styrene monomer | 135–184 | 25 |
| n-Butyllithium solution | 135 | |
| Butadiene monomer | 176–211 | 23 |
| Epoxol 9-5 coupling agent | 192–202 | 15 |
| $CO_2$ | 202–190 | 15 |
| Antioxidant a | 190 | 10 | a Polygard HR, 1.5 parts (tris-nonylphenyl phosphite plus ½% triisopropanolamine) BHT 0.5 part (2,6-di-tert-butyl-4-methylphenol).

NOTE.—Polymer recovered by evaporating the cyclohexane solvent, recovered polymer dried in a vacuum oven at 160–200° F., milled at 300° F., and chopped. Color rating of injection molded sample=4.

As can be seen from this table, carbon dioxide alone is ineffective as a treating agent.

Thus it is shown by Table I that conventional acid and alcohol treatments for removing color from systems containing lithium-carbon bonds do not work in the system of this invention. Tables II, III and IV show unexpectedly that the combination of water and carbon dioxide is effective. Tables V and VI reveal that neither the water or carbon dioxide alone is effective.

While this invention has been described in detail for the purpose of illustration it is not to be limited thereby, but is intended to cover all changes and modifications within the spirit and scope thereof.

We claim:

1. A method comprising; adding carbon dioxide and water to an effluent from a polymerization reaction, wherein at least one monomer is initiated with an organolithium initiator and thereafter the resulting polymer molecules having an active lithium atom on one end are contacted with a coupling agent having at least two reactive groups which coupling results in the generation of LiO—, LiS— or

groups attached either to said coupling agent or to a 1–20 carbon atom radical from said coupling agent, said carbon dioxide being present in an amount within the range of 0.8 to 2 times the stoichiometric amount based on said lithium with said carbon dioxide and water being present in a ratio of 0.5 to 100 mols of water per mol of carbon dioxide, the resulting carbon dioxide and water treatment being carried out for a time within the range of 0.01 to 100 minutes.

2. A method according to claim 1 wherein said at least two reactive groups are selected from the group consisting of

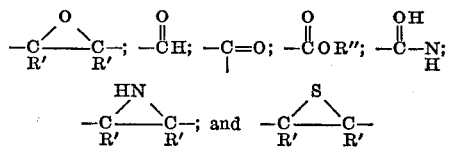

or at least two reactive groups selected from the group consisting of —OR''', —SR''' and

which are attached to a silicon atom,
wherein R' is hydrogen or 1–8 carbon atom hydrocarbon groups, R'' is hydrogen or 1–20 carbon atom hydrocarbon groups and R''' is a 1–20 carbon atom hydrocarbon group.

3. A method according to claim 1 wherein said carbon dioxide is added in an approximately stoichiometric amount relative to the amount of lithium in the polymer.

4. A method according to claim 3 wherein said water is present in an amount within the range of 0.5 to 10 mols per mol of carbon dioxide.

5. A method according to claim 1 wherein said polymer is a polymer produced by the sequential addition of butadiene and styrene to the polymerization system.

6. A method according to claim 5 wherein said styrene is added in at least two increments along with additional initiator.

7. A method according to claim 1 wherein said coupling agent has reactive groups selected from the group consisting of

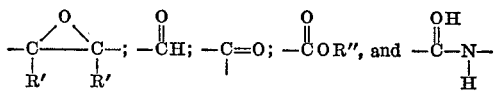

8. A method according to claim 7 wherein said coupling agent is an epoxidized unsaturated oil.

9. A method according to clam 8 wherein said coupling agent has the approximate formula

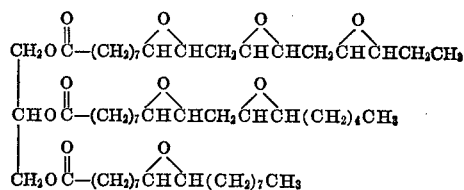

10. A method according to claim 7 wherein said coupling agent is epoxidized soybean oil.

11. A method according to claim 8 wherein said polymer is a polymer of butadiene and styrene.

12. A method according to claim 11 wherein said polymer is produced by the sequential addition of styrene and then butadiene, said styrene being present in an amount within the range of 70–95 weight percent so as to give a resinous polymer.

13. A method according to claim 1 wherein said polymer is a styrene-butadiene polymer prepared wherein the styrene is added first and thereafter the butadiene is added and wherein the resulting polymer comprises 70–95 weight percent polymerized styrene.

14. A method according to claim 1 wherein said coupling agent has at least two groups selected from the group consisting of —OR″, —SR‴ and $$-\underset{R'''}{\text{NH}}$$

attached to a silicon atom.

References Cited

UNITED STATES PATENTS

| | | | |
|---|---|---|---|
| 3,135,716 | 6/1964 | Uraneck et al. | 260—94.7 R |
| 3,281,383 | 10/1966 | Zelinski et al. | 260—94.7 R |
| 3,692,874 | 9/1972 | Farrar et al. | 260—94.7 N |

JAMES A. SEIDLECK, Primary Examiner

W. F. HAMROCK, Assistant Examiner

U.S. Cl. X.R.

260—83.7, 85.1, 94.7 N, 880 B